(12) United States Patent
Bono et al.

(10) Patent No.: US 9,400,741 B1
(45) Date of Patent: Jul. 26, 2016

(54) RECLAIMING SPACE FROM FILE SYSTEM HOSTING MANY PRIMARY STORAGE OBJECTS AND THEIR SNAPSHOTS

(71) Applicant: EMC Corporation, Hopkinton, MA (US)

(72) Inventors: Jean-Pierre Bono, Westborough, MA (US); William C. Davenport, Burlington, MA (US); Alexander Mathews, Jamesburg, NJ (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 51 days.

(21) Appl. No.: 14/319,455

(22) Filed: Jun. 30, 2014

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/02* | (2006.01) | |
| *G06F 3/06* | (2006.01) | |
| *G06F 11/14* | (2006.01) | |

(52) U.S. Cl.
CPC .............. *G06F 12/023* (2013.01); *G06F 3/065* (2013.01); *G06F 3/067* (2013.01); *G06F 3/0619* (2013.01); *G06F 3/0655* (2013.01); *G06F 11/1453* (2013.01)

(58) Field of Classification Search
CPC .......................... G06F 12/023; G06F 11/1453
See application file for complete search history.

(56) References Cited

U.S. PATENT DOCUMENTS

| | | | | |
|---|---|---|---|---|
| 6,804,719 B1 * | 10/2004 | Cabrera | ............ | G06F 17/30221 707/999.01 |
| 6,912,641 B2 * | 6/2005 | Chen | ....................... | G06F 12/08 711/170 |
| 7,555,504 B2 * | 6/2009 | Bixby | ............... | G06F 17/30088 |
| 7,594,085 B1 * | 9/2009 | Rao | ...................... | G06F 11/1471 707/999.202 |
| 7,631,155 B1 | 12/2009 | Bono et al. | | |
| 7,738,866 B2 * | 6/2010 | Vitanov | .................. | G06F 9/485 455/186.1 |
| 7,761,456 B1 * | 7/2010 | Cram | .................. | G06F 11/1435 707/754 |
| 7,769,722 B1 * | 8/2010 | Bergant | .............. | G06F 11/2097 707/681 |
| 7,818,535 B1 | 10/2010 | Bono et al. | | |
| 7,904,690 B2 * | 3/2011 | Batterywala | .......... | G06F 3/0605 711/170 |
| 8,032,491 B1 * | 10/2011 | Appellof | ............. | G06F 11/1435 707/649 |

(Continued)

OTHER PUBLICATIONS

Definition of thin provisioning; Webopedia; Jan. 2, 2010; retrieved from https://web.archive.org/web/20100102073319/http://webopedia.com/TERM/T/thin_provisioning.html on Nov. 19, 2015 (1 page).*

(Continued)

*Primary Examiner* — Mark Giardino, Jr.
*Assistant Examiner* — Daniel C Chappell
(74) *Attorney, Agent, or Firm* — BainwoodHuang

(57) ABSTRACT

Reclaiming storage from a file system hosting of storage objects includes assigning objects and respective files to version sets, each version set containing a primary object and respective snapshots. Each block of storage is associated with the version set of the file(s) that contain the block. Blocks residing in an extent that is to be reclaimed are identified, and for each block (i) an offset is obtained that specifies a location of the block in a file, (ii) files whose objects are assigned to the version set associated with the block are identified, (iii) a block pointer at the location in each of the identified underlying files is examined, and for each file whose block pointer points to the block, updating the block pointer to point to a new block location outside of the extent, to which the block is moved.

20 Claims, 5 Drawing Sheets

(56) References Cited

U.S. PATENT DOCUMENTS

| | | | | |
|---|---|---|---|---|
| 8,140,814 B2* | 3/2012 | Agombar | G06F 3/0608 707/674 |
| 8,285,758 B1* | 10/2012 | Bono | G06F 17/30079 707/822 |
| 8,285,967 B1* | 10/2012 | Veeraswamy | G06F 17/30091 707/821 |
| 8,549,518 B1* | 10/2013 | Aron | G06F 9/45558 718/1 |
| 8,566,371 B1* | 10/2013 | Bono | G06F 17/30079 707/822 |
| 8,880,843 B2* | 11/2014 | Thomas | G06F 11/2094 711/114 |
| 9,052,918 B2* | 6/2015 | Clerc | G06F 12/02 711/165 |
| 9,053,003 B2* | 6/2015 | Tsirogiannis | G06F 12/023 |
| 9,195,585 B2* | 11/2015 | Phelan | G06F 12/0246 |
| 2009/0089516 A1* | 4/2009 | Pelts | G06F 3/0608 711/154 |
| 2009/0265399 A1* | 10/2009 | Cannon | G06F 17/30156 |
| 2012/0130949 A1* | 5/2012 | Picken | G06F 17/30174 707/626 |
| 2013/0073519 A1* | 3/2013 | Lewis | G06F 17/30215 707/610 |

OTHER PUBLICATIONS

Definition of inode; Free Online Dictionary of Computing; Jun. 20, 2010; retrieved from https://web.archive.org/web/20100620234550/http://foldoc.org/inode on Nov. 18, 2015 (1 page).*
A database architecture and version control for group work; Kamita et al; Proceedings of the Twenty-Seventh Hawaii International Conference on System Sciences; Jan. 4-7, 1994; pp. 438-447 (10 pages).*

* cited by examiner

RECLAIMING SPACE FROM FILE SYSTEM HOSTING MANY PRIMARY STORAGE OBJECTS AND THEIR SNAPSHOTS

BACKGROUND

The present invention is related to the field of data storage systems.

Data storage systems may utilize a file-based representation of block-oriented storage objects that are exposed to external users, such as host computers accessing the data storage system via a network. For example, a logical unit of storage or LUN is a block-oriented storage object visible as a block-oriented storage device to a host computer. Internally, however, the storage system may map the LUN into a file of an internal file system, and then manage access and other aspects of the LUN by corresponding operations on the mapped file. This organization can help enhance efficiency of processing storage operations. Additionally, in current systems employing virtual computing technology, units of virtualized storage for virtual machines may be represented as files of a distributed file system used by a host computer and one or more network-attached storage (NAS) systems. Within a host, accessing a virtualized storage unit requires a mapping to a file of the distributed file system, and within the storage system the file is mapped to underlying physical storage that contains the data of the virtualized storage unit. This mapping may be a multi-level mapping that may include use of a separate internal file system. Both the distributed file system and the internal file system may be described as "hosting" the virtualized storage units.

SUMMARY

Modern data storage systems may host a large number of storage objects, especially in virtualization environments having large numbers of virtual machines executing on physical hosts. The population of storage objects may include not only the on-line, application-visible primary objects, but any of various derivatives that might be created and utilized in providing different storage services such as data replication and real-time backups or "snapshots" (also referred to as "snaps"). For example, if a virtualized computing environment has very stringent requirements for data integrity and recovery, the data storage system may be taking snaps of primary storage objects at intervals on the order of tens or ones of minutes. Thus, at any given time a storage system may be storing thousands of primary objects along with hundreds or potentially thousands of snaps for each primary object.

Another facet of modern computer systems including those employing virtualization technology is dynamism in the population of storage objects. Virtual machines and their underlying storage objects may be created, cloned, migrated and deleted at a high rate. This presents a challenge in managing the use of available storage resources for maximum efficiency and performance. Included in such managing of storage resources is monitoring and reclaiming free space, i.e., units of storage currently allocated or assigned to a particular storage object, file system, etc. but no longer storing any live (system- or application-visible) data, for other uses.

Resource management including reclamation of free space can be complicated by the use of block sharing within a storage system. Services provided by a data storage system, including snapshotting, may utilize block sharing to avoid unnecessary duplication of data and thereby make efficient use of available physical storage space. For data blocks that are identical to corresponding blocks of a primary object, a snap may employ pointers to such blocks of the primary object rather than storing its own duplicate copies. Such block sharing must be accommodated when reclaiming free space. Specifically, if live data blocks are moved around so as to free up larger contiguous chunks of storage space for reclaiming, then it is necessary to identify all objects that share such blocks and update the respective pointers of all those objects to point to new locations of data blocks that are moved. This task grows in size as the number of primary objects and the number of snaps increases.

The present disclosure is directed to efficiently identifying storage objects that are sharing data blocks, providing corresponding efficiency in relocating blocks as part of reclaiming space from a file system storing the objects.

In particular, a method is disclosed for reclaiming storage assigned to an upper file system hosting a set of storage objects including primary objects and respective snapshot objects, wherein the storage objects are hosted as respective files of the upper file system backed by an underlying file of a lower file system, and the underlying file is constituted by respective sets of fixed-size blocks of the storage.

The method includes assigning the objects and their respective files to version sets, each primary object and its respective snapshot objects being assigned to a respective distinct version set. The files of each version set selectively share blocks that are unchanged across the files sharing the blocks. In one embodiment a database may be used that associates the version sets with the objects they contain. Because all snaps of a primary object are in the same version set as the primary object, all files sharing any given block are located in the same version set. The files of a version set may be referred to as a "snap domain".

An association is made between each block and the version set to which the files constituted by the block are assigned. In one embodiment, block metadata of each block may include a respective version set identifier that uniquely identifies the associated version set.

During reclamation, those blocks residing in an extent of the underlying file that are to be moved are identified, and the following is done for each identified block:
(i) Obtaining an offset specifying a location of the block in a file of the version set;
(ii) Identifying the files whose corresponding objects are assigned to the version set with which the block is associated;
(iii) Examining a block pointer at the location in each of the identified files, and for each file whose block pointer points to the block, updating the block pointer to point to a new block location outside of the extent; and
(iv) Moving the block to the new block location.

In one embodiment, the offset for each block is stored in block metadata, and may be stored along with the version set identifier for example. Thus obtaining the offset and identifying the files for a block include examining the block metadata.

Upon completion of the above for all blocks to be moved, the extent can be removed from the underlying file of the lower file system. In general, the freed space may be returned to a pool from which storage is allocated for other uses, such as by other file systems that may need to grow.

Through use of version sets, the number of files to be examined for sharing of a particular block is limited to only the files of a given version set, rather than having to examine potentially all the files of the upper file system. Also, one feature of snapshots in particular is that a shared block is located at the same offset in all sharing objects. It is efficient to store one offset value (e.g., in block metadata) and to examine only one location (at the offset) in each file of a version set. Thus, the disclosed technique can promote efficient reclamation of storage space even in a storage system hosting a large number of objects in the form of primary objects and respective snapshots.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
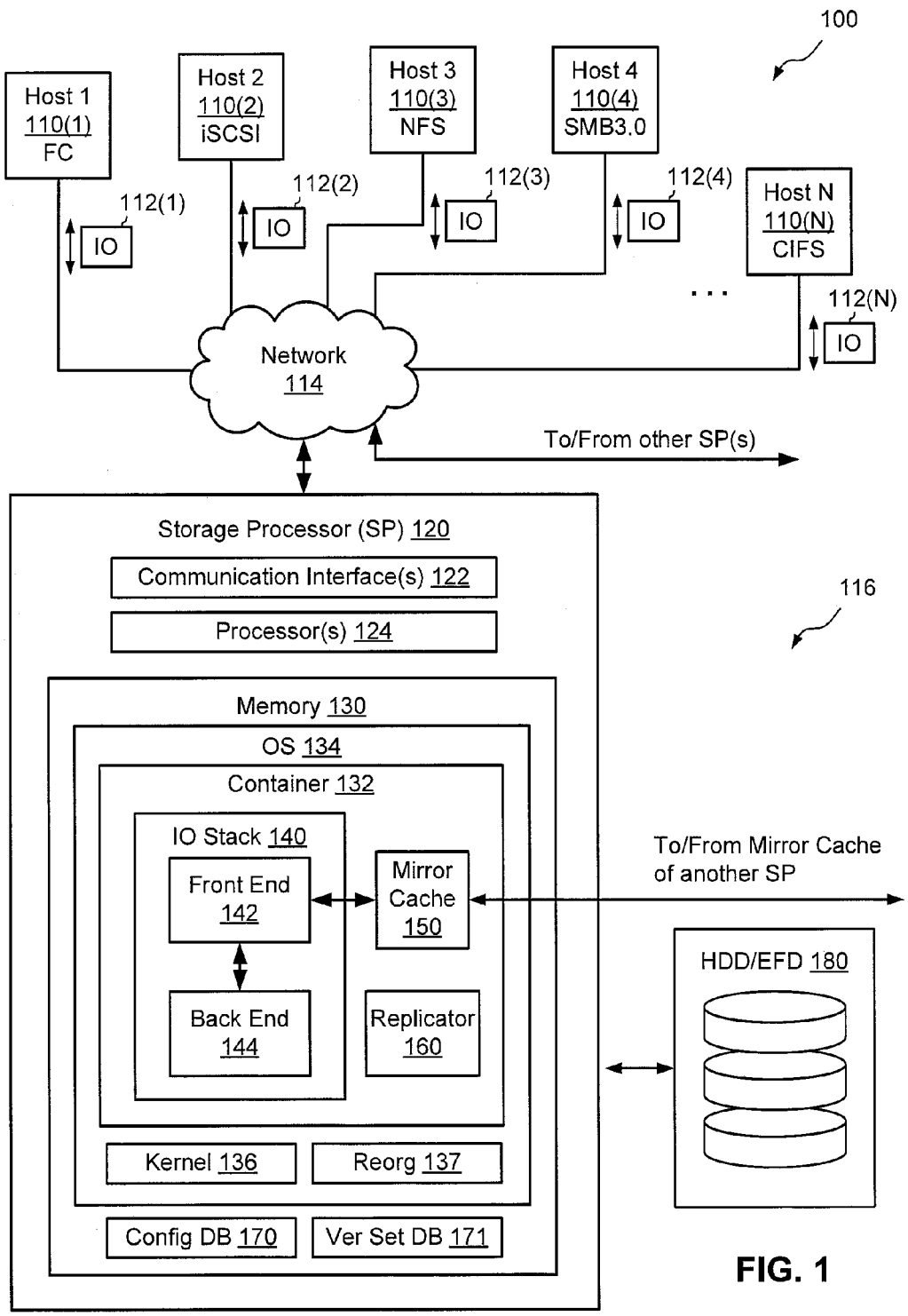
FIG. 1 is a block diagram of a data processing system with particular emphasis on structure of a data storage system therein.

FIG. 1 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136 and a file system reorganizer (Reorg) 137. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170 and version set database (Ver Set DB) 171. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network. The version set database 171 stores information pertaining to a version set organization of host files in the storage system. In one embodiment the version set database 171 is part of a host file system (also referred to as an "upper-deck" file system below), that employs version sets. For example, it may be stored in a hidden directory located directly under root in the upper-deck file system. The use of the version set database 171 is described further below.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
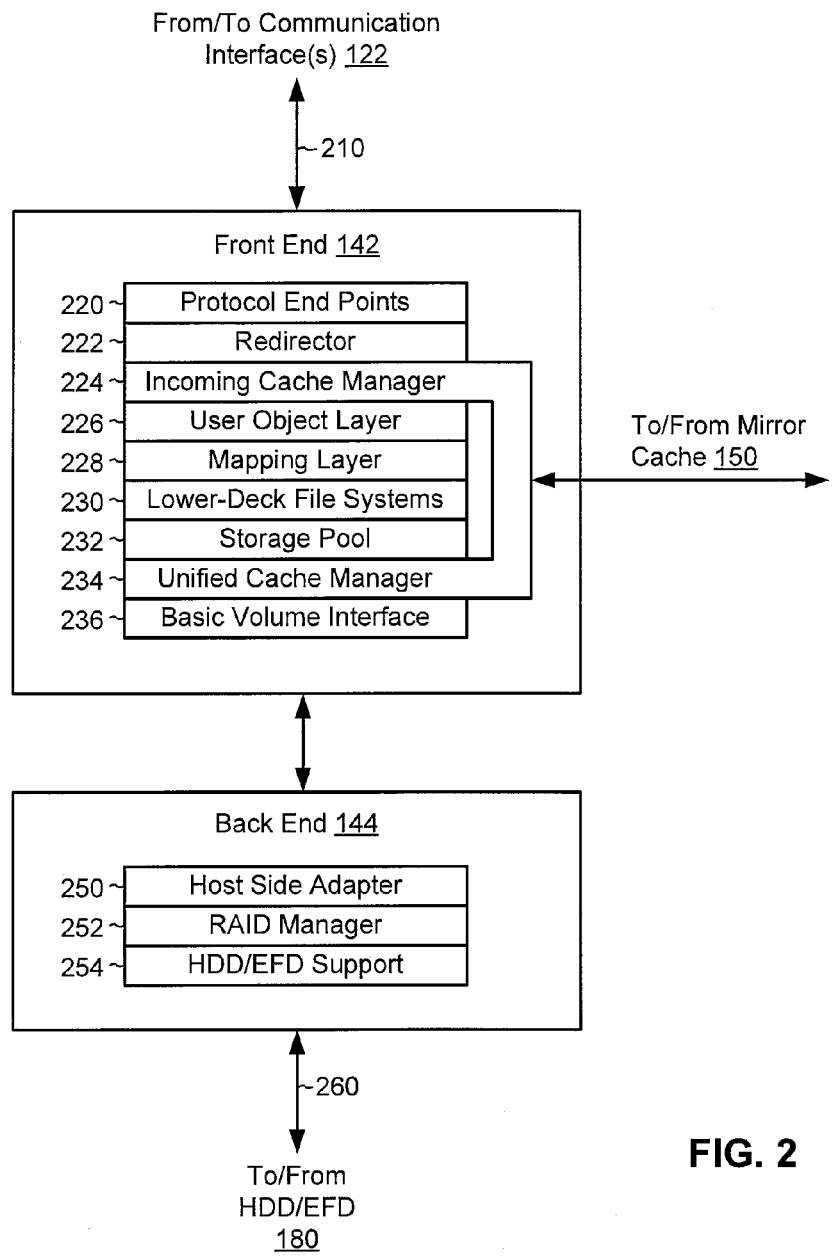
FIG. 2 is a schematic diagram of operating software in the data storage system.

FIG. 2 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144. Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
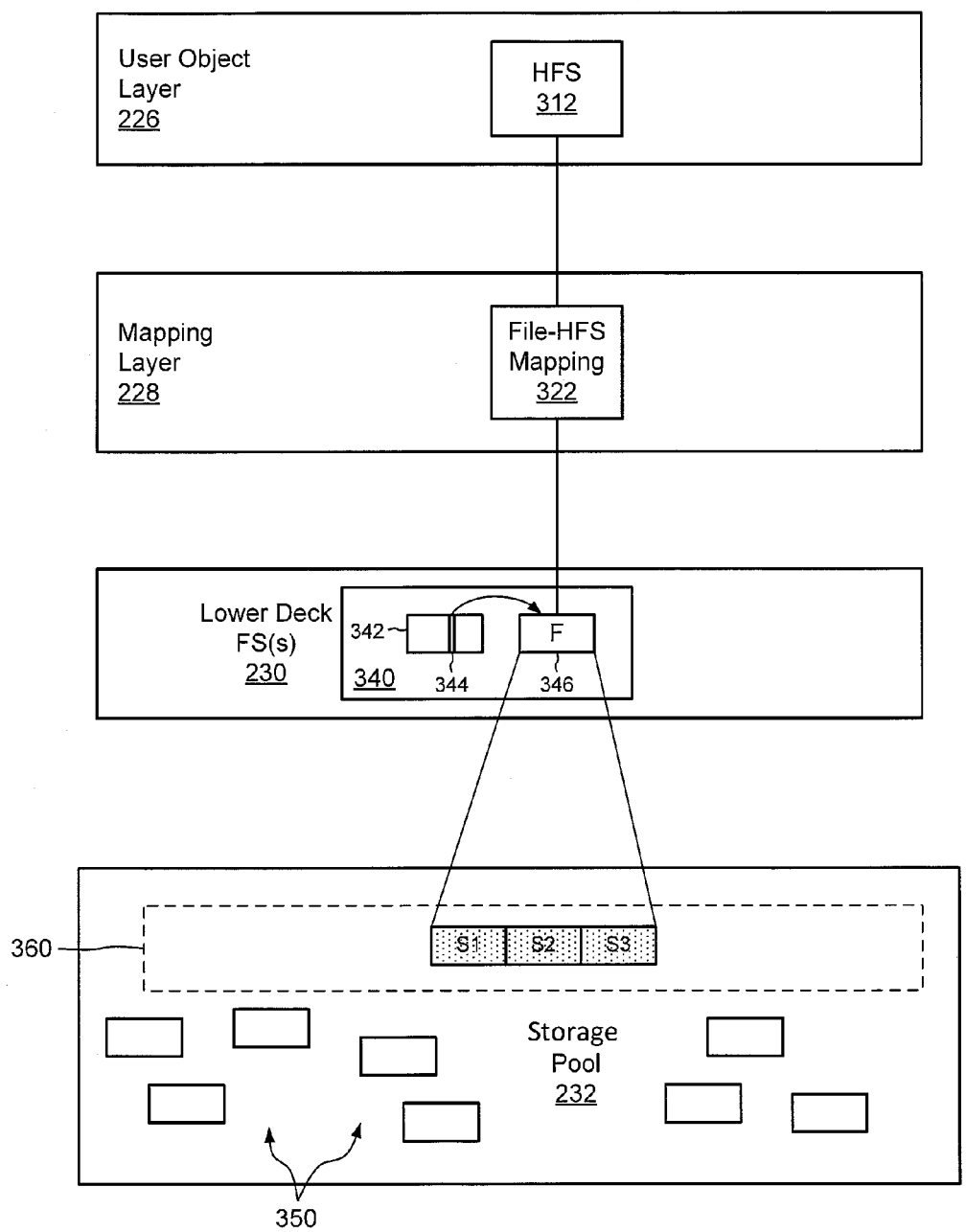
FIG. 3 is a schematic diagram of relationships among functional layers in the operating software.

FIG. 3 shows portions of the front end 142 in additional detail. Here, the user object layer 226 includes a representation of an HFS (host file system) 312, and the mapping layer 228 includes a file-to-HFS mapping 322. The file-to-HFS mapping 322 maps the HFS 312 to a file F (346). Through the file-to-HFS mapping 322, any file or directory of the HFS 312 is mapped to a corresponding set of blocks within the file 346.

The file 346 is included within a particular lower-deck file system 340. The lower-deck file system 340 includes an inode table 342. The inode table 342 provides information about files in the lower-deck file system 340 in the form of inodes. For example, the inode table 342 of the lower-deck file system 340 includes an inode 344 which provides file-specific information about the file 346. The information stored in each inode includes location information (e.g., data block locations) where the data of the respective file is stored, and may thus be accessed as metadata to identify the locations of the file 346.

Although a single file is shown for the lower-deck file system 340, it is understood that each of the lower-deck file systems 230 may include any number of files, each having its own entry in the respective inode table of its file system. Also, a lower-deck file system may store not only regular files such as the file F 346, but also snapshots (point-in-time copies, also called "snaps") of such files. In this context the original file (e.g., file F 346) is referred to as a "primary" file. For instance, the lower-deck file system 340 stores the primary file 346 along with a different file for every snap of that file (such snaps effectively forming snaps of the HFS 312).

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

At least some of the lower-deck file systems 230 may be associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. In some cases such upper sparse volumes may be coupled with an additional pool, similar to pool 232 defined at this upper layer. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4:
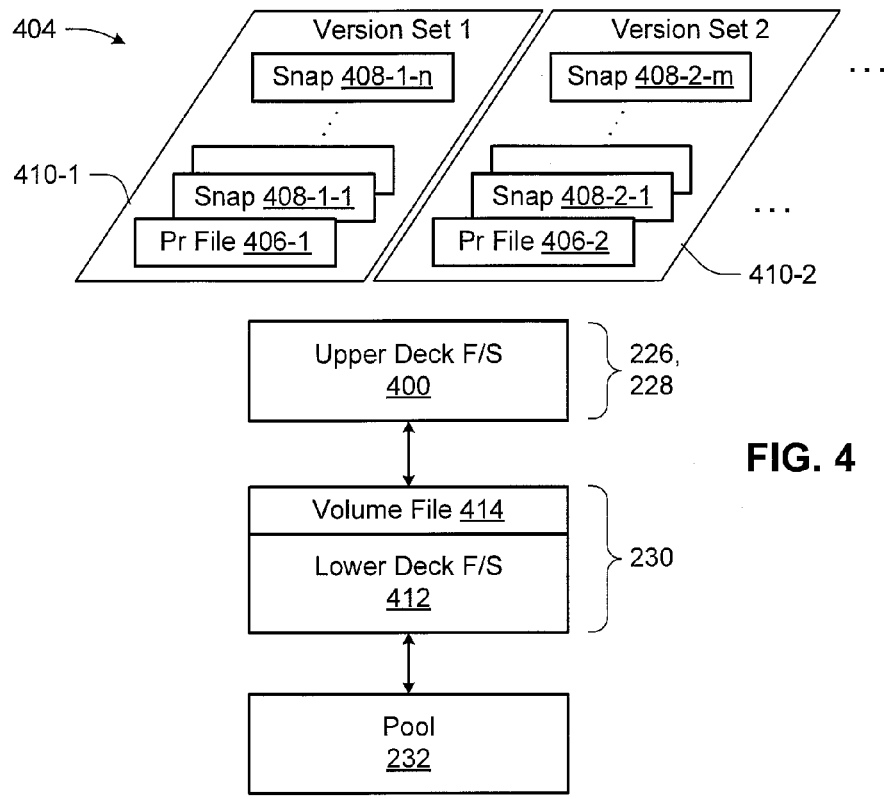
FIG. 4 is a schematic diagram of operating software in conjunction with use of version set organization of host files.

FIG. 4 shows another view of the organization of the data storage system useful for describing certain functionality as presented below. In FIG. 4, the user object and mapping layers 226, 228 include an upper-deck file system 400. As shown, the upper-deck file system 400 presents data in the form of host files 404 to a separate host computer (not shown). In particular, the files 404 include a number of primary files (Pr file) 406 (406-1, 406-2, etc.) and, for each primary file 406, a respective set of snaps 408 (e.g., snaps 408-1-1 through 408-1-*n* for primary file 406-1, snaps 408-2-1 through 408-1-*m* for primary file 406-2, etc.). As shown, each primary file 406 and its respective snaps 408 are organized into a respective "version set" 410 (410-1, 410-2, etc.), which is done in support of efficient file system reorganization as described below. The lower-deck file system layer 230 includes a lower-deck file system 412, which presents a file referred to as a "volume file" 414 to the upper-deck file system 400.

The upper deck file system 400 may be either fully provisioned (referred to as "thick") or more dynamically provisioned in response to demand (referred to as "thin" or "thinly provisioned"). For a thick upper deck file system 400, underlying storage is fully reserved, meaning that the configured size of the upper-deck file system 400 is equal to the amount of storage in the pool 232 reserved for use by the upper-deck file system 400 to the exclusion of other potential users (e.g., other file systems 230). At any given moment, slices reserved to the thick upper deck file system 400 may be in use for storing file system data or they may be unused and residing in the pool 232. However, they are not available for use by other file systems 230. For a thin upper deck file system 400, underlying storage is not fully reserved, meaning that the configured size of the upper-deck file system 400 is greater than the amount of storage in the pool 232 reserved for use by the upper-deck file system 400 to the exclusion of other potential users (e.g., other file systems 230). The reservation of slices to the upper deck file system 400 is managed automatically by resource management components, including the Reorganizer 137 (FIG. 1), of the storage system. As described below, the process of reorganizing free space may be initiated in different ways depending on whether the upper deck file system 400 is thick or thin.

The organization shown in FIG. 4 can be used to support virtualization of storage resources for external hosts running virtualization software. Examples include the storage of "virtual machine disks" (VMDKs) or virtual hard disks (VHDs), which are virtualized storage objects utilized by VMWare® and Windows® respectively. In particular, each primary file 406 stores the contents of a respective primary virtual storage object, which is accessed by one or more external hosts using a file paradigm and distributed file protocol such as NFS, CIFS etc. In this use, each version set 410 contains the files 406, 408 for a given primary virtual storage object and its respective snaps. In this context, "primary" denotes the current in-use version of the object that is continually modified by normal operation of the application(s) accessing the object, e.g., a banking application updating user account records as transactions occur. The snapshot objects are point-in-time copies of the primary object at preceding instants.

In a large production system, the storage system 116 may be required to store hundreds or thousands of virtual storage objects, which correspond to primary files 406. Each virtual storage object is used by a corresponding virtual machine of an external host 110, and for each such object potentially a large number of snaps 408 may also be maintained depending on the application and its need for snapshot granularity and time span. Thus there may be a large number of version sets 410, and in general the version sets 410 may themselves be quite large.

Additionally, in modern storage systems the population and sizes of virtual storage objects may be quite dynamic. In virtualized computing systems, virtual machines may be frequently created, deleted, cloned and moved, and as that activity occurs there can be corresponding needs to create, delete, replicate and migrate virtual storage objects. In VMWare systems, this activity may be under control of a component referred to as VMotion™. It is generally the responsibility of the external host software to manage the size of an upper deck file system 400 to adequately support the host's need for virtual storage objects, which includes increasing the size of the file system 400 as the net number of virtual storage objects in the file system 400 increases, and decreasing the size of the file system 400 as the net number of virtual storage objects in the file system 400 decreases. The storage system 116 is responsible organizing and reorganizing its own internal use of storage resources to adapt to growth or shrinkage of the upper deck file system 400. In particular, a technique is described below that is used by the storage system 116 to reorganize free space resulting from shrinkage of an upper deck file system 400, in order to advantageously return unused slices to the pool 232 to be available for other uses as needed.

Figure 5:
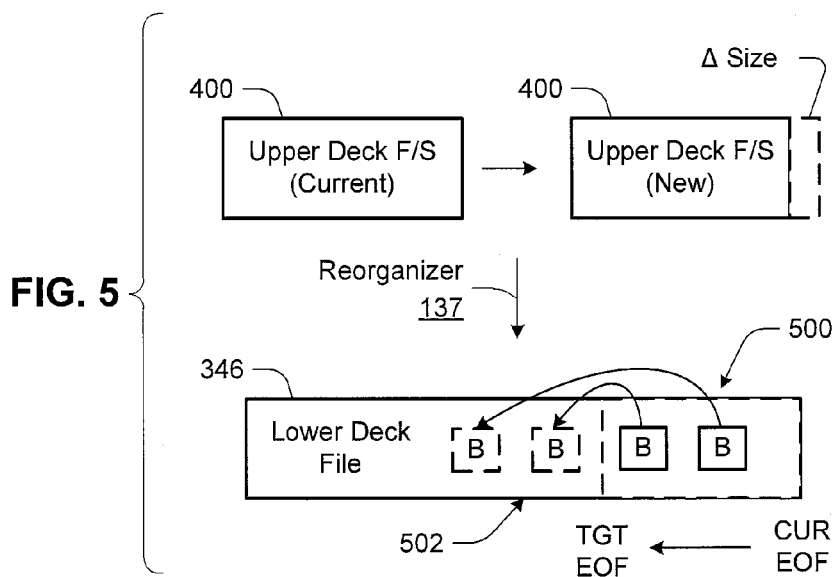
FIG. 5 is a schematic diagram depicting a manner of shrinking a file system and underlying file in connection with reclaiming storage space.

FIG. 5 provides a schematic depiction of reorganizing free space in response to shrinking of the upper deck file system 400. The upper part of FIG. 5 shows that shrinking by an amount "Δ Size" (change of size). In response, the size of the underlying file 346 of the lower deck file system 412 is also to be shrunk by some corresponding amount (maybe, but not necessarily, the same as Δ Size). This shrinking is indicated by the positions of the "current end-of-file" (CUR EOF) and "target end-of-file" (TGT EOF). As one simple example, Δ Size might represent a 10% shrinking of the upper deck file system 400, and the file 346 is to be shrunk accordingly. Thus, if CUR EOF is expressed as a maximum offset into the file 346 from its beginning (taken as offset zero), then TGT EOF is set to a value 10% less than CUR EOF.

The manner of shrinking the file 346 can be referred to as "truncation", i.e., removing an extent at the far end (highest offset) of the file. In general it is necessary to relocate any in-use data blocks 500 located above (or past) TGT EOF to new locations 502 below (or before) TGT EOF before actually committing to the TGT EOF value as defining the new file size. The identification and moving of the blocks 500 is done by the management component called "Reorganizer" 137, shown in FIG. 1.

One issue with the scheme of FIG. 5 is that moving the blocks 500 is complicated when blocks are shared, such as in the disclosed system supporting snapshotting. As generally known, one manner of creating a snap involves saving only those data blocks that have changed since a most recent preceding snap 408, and for all other (unchanged) blocks pointing to a copy of the block saved in either a preceding snapshot 408 or the primary file 406, depending on whether and when the block has most recently changed. Any such block is said to be "shared" among all files 406, 408 pointing to it.

Thus when a block 500 is moved as in FIG. 5, the metadata of each file 406, 408 containing that block must be updated to point to the new location of the block. This first requires that all files sharing a block 500 are identified, and then updating the metadata of the identified files. In a typical file system arrangement, there is no built-in mechanism for translating from a known block to the unknown set of all the files sharing that block. Thus if a typical file system arrangement were used, in general it would be necessary to examine each file of the file system to determine whether it points to a given block—a task that would be intractable for a file system storing a large number of files.

Below is a short table presenting a simplified example of block sharing for purposes of further description below. There are four files—two primary files Pri 1 and Pri 2 and two snaps Snap 1-1 and Snap 1-2 of the primary file Pri 1. These files store various combinations of a set of blocks B1, B2, . . . , B8. Shared blocks are indicated in bold.

TABLE 1

| Block Sharing | |
| --- | --- |
| File | Block Pointers |
| Pri 1 | B1, B2, B8 |
| Pri 2 | B4, B5, B6 |
| Snap 1-1 | B1, B3 |
| Snap 1-2 | B1, B3, B7 |

In this example, block B1 is shared by files Pri 1, Snap 1-1 and Snap 1-2, and block B3 is shared by files Snap 1-1 and Snap 1-2. Thus, if either block B1 or B3 is to be moved during reorganization, then it is necessary to identify the files containing these blocks and modify the block pointers to point to the new locations of these blocks.

In the illustrated example of block sharing in support of snapshotting in particular, there is one beneficial limitation on the scope of the task of identifying files sharing a block. Any block that is shared among multiple files 404 will be located at the exact same logical offset in all those files. Thus, it is not necessary to examine all the block pointers for each file 404, as would be necessary if a shared block could reside anywhere in the files (which might be the case for deduplication, for example). It is only necessary to examine the block pointer at a given offset of files 404. This reduces the task considerably.

Nonetheless, there is still the problem of a large number of files—many primary files 406 and their many snaps 408. The organization of files 404 into version sets 410 addresses this problem. It supports a simpler and more efficient way to identify sharing of blocks 500 that are being moved as part of reorganizing free space. Essentially, each block of each file 406, 408 is tagged with an identifier of the version set 410 containing the file 406, 408 that owns the block. This tagging can be done relatively straightforwardly and managed with relatively low overhead, as explained below. When a block 500 is to be moved, the tag is used to identify a version set 410, and a separate mechanism is used to map the identified version set 410 to the identifications of all the files 406, 408 of that version set 410. Once the files 406, 408 are identified, then the Reorganizer 137 examines only those files (at the same offset as described above) to identify the specific ones of the files 406, 408 that are actually sharing the block 500. It can then modify the block pointer of each such file to point to the new block location 502. This process is repeated for each block 500 to be moved. Note that, in general, distinct blocks 500 will be associated with distinct version sets 410. The blocks 500 are then moved, and with the upper portion of the file 346 clear of live data the file 346 is then shrunk by truncation as mentioned above. This process is more tractable and realistic for use because of the considerable reduction in number of files to be examined for sharing of blocks.

The above-mentioned tagging of blocks can be done using certain metadata, referred to as "block metadata" or BMD, that is stored in association with each block. Some small amount of BMD is generally used in file systems to record information needed in managing the data blocks of files. One basic piece of BMD is an offset value which identifies the location of the block relative to the start of the file containing the block. If services such as replication are used, then BMD might also include information identifying a replica that owns the block. In support of the presently disclosed technique using version sets 410, BMD includes a version set identifier or VS ID. When a block becomes allocated to a particular primary file 406, then the VS ID for the version set 410 that includes the file 406 is added to the BMD for that block. The VS ID may be structured to support some reasonable maximum number of version sets. For example, if it is desired to enable as many as 64K version sets 410 to be defined, then the VS ID may be a 16-bit numerical value. Other schemes are of course possible.

The association of files 404 to version sets 410 is done using separate metadata accessible to the Reorganizer 137, which in one embodiment includes the version set database 171 (FIG. 1). This metadata is made persistent within the storage system using a resource reserved for overhead functions (in contrast to user data). For example, one or more of the HDDs 180 (FIG. 1) may serve as an administrative volume for storing the version set database 171 as well as other overhead data used during operation.

Continuing with the above simplified example, below is a table representing the contents of the version set database 171 that associates files 404 to version sets 410. In this example, the complete set of files are those shown above, i.e., Pri 1, Pri 2, Snap 1-1 and Snap 1-2.

TABLE 2

| Version Set Contents | |
| --- | --- |
| VS ID | Files |
| VS 1 | Pri 1 |
| | Snap 1-1 |
| | Snap 1-2 |
| VS 2 | Pri 2 |

In this example there are two version sets 410, identified as VS 1 and VS 2. VS 1 contains three files—Pri1, Snap 1-1 and Snap 1-2. VS 2 contains only the single file Pri 2.

Figure 6:
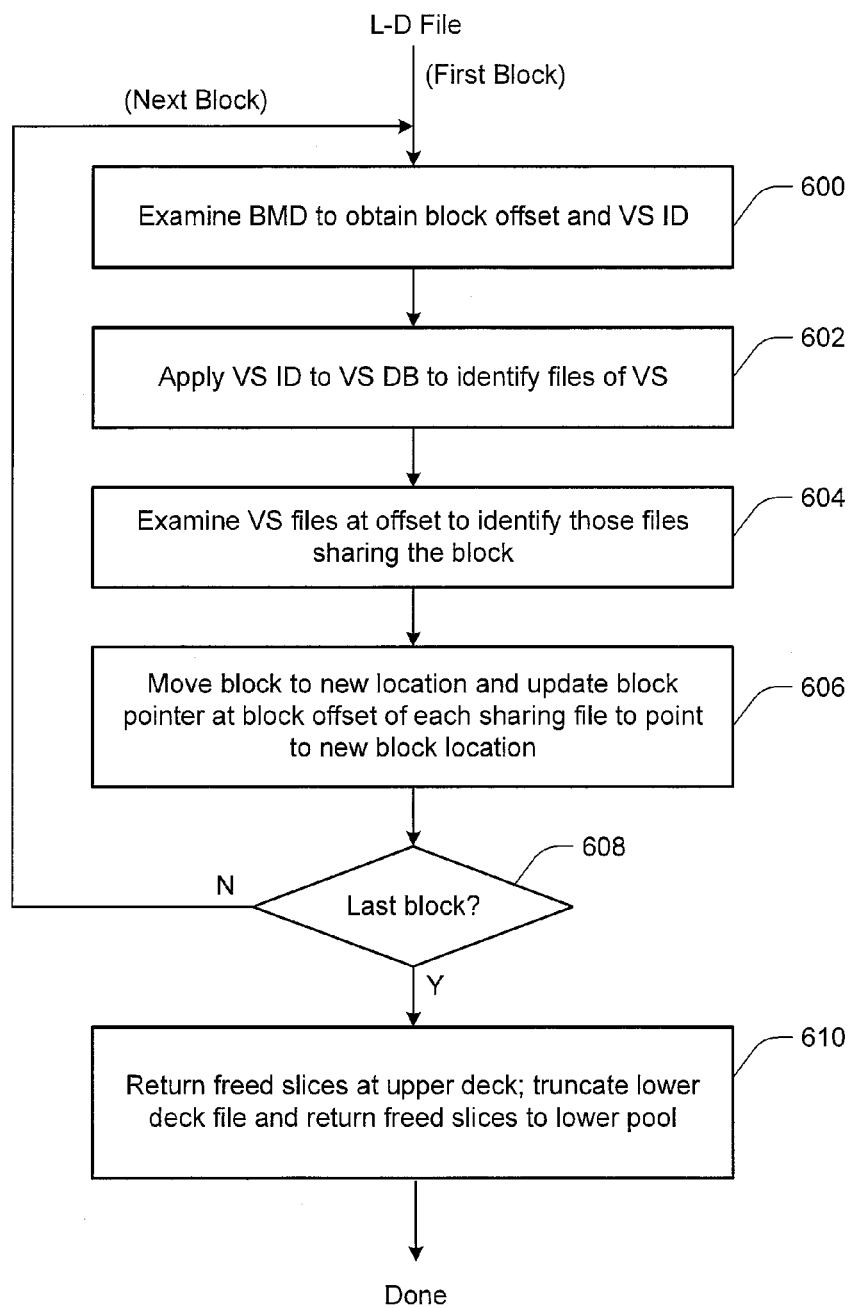
FIG. 6 is a flow diagram of a process of reorganizing free space in connection with reclaiming storage space.

FIG. 6 is a high-level flowchart of the reorganization process in pertinent part. It includes a set of steps performed for each block 500 to be moved, starting with a first block and iterating for each additional block. As mentioned above, this process may be initiated in different ways depending on the needs and features of a particular storage system. In the case of a fully reserved upper-deck file system 400 as described above, the process is initiated by explicit action of an authorized user or application. In the case of a thin upper-deck file system 400 as also described above, there may be a monitoring mechanism that detects a shrinkage of the upper-deck file system 400 by some predetermined amount, and responds by initiating the reorganization process as outlined in FIG. 6. In particular, the monitoring mechanism may be monitoring the amount of free space (unused blocks) in the upper-deck file system 400, and initiate reorganization when the amount of free space increases above some predetermined threshold, which may be fixed or configurable.

At 600, the BMD for the current block is examined to obtain the block offset, VS ID and replica ID. The replica ID is a monotonically increasing value, assigned when a file is created. Thus, the replica ID can be used to further limit the scope of the search for sharing files—only those files in the version set 410 that have a replica ID greater than or equal to the replica ID stored in the BMD are examined. At 602 the VS ID is applied to the version set database 171 to identify the files 406, 408 that are part of the identified version set. At 604, each of these files is examined (limited by replica ID, as mentioned) at the offset obtained from the BMD, to determine whether the subject block is pointed to by the pointer at that offset, i.e., whether the file is sharing the block. At 606 the block pointer at the offset in each such sharing file is updated to point to the new block location, and the block is moved to the new block location. At 608 is the iteration condition, i.e., whether all blocks 500 that need to be moved have been processed. If not, the above process is repeated for the next block.

One all blocks 500 have been processed, then at 610 the freed space is actually reclaimed. The upper-deck file system 400 returns freed slices to an upper deck storage pool (not shown). That storage from the upper deck pool is then returned to lower deck pool through the truncation of the lower-deck file 346. The file is truncated to the size corresponding to the TGT EOF.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a storage processor to reclaim storage assigned to an upper file system hosting a set of storage objects including primary objects and respective snapshot objects, the storage objects hosted as respective files of the upper file system backed by an underlying file of a lower file system, the underlying file constituted by respective sets of fixed-size blocks of the storage, the method comprising:

assigning the storage objects and their respective files to version sets, each primary object and its respective snapshot objects being assigned to a respective distinct version set, the files of each version set selectively sharing blocks, each block having corresponding block-specific block metadata containing a respective version set identifier identifying the version set to which the files constituted by the block are assigned, the blocks of a given file having respective distinct block-specific block metadata, the block metadata forming part of the upper file system;

identifying blocks in an extent of the underlying file to be moves, and for each identified block:
  i. obtaining an offset specifying a block location of the block in a file of the version set;
  ii. obtaining the version set identifier from the block metadata for the block and using the version set identifier to identify the files whose corresponding storage objects are assigned to the version set with which the block is associated;
  iii. using the offset to examine a block pointer at the block location in each of the identified files, and for each file whose block pointer points to the block, updating the block pointer to point to a new block location outside of the extent; and
  iv. mobbing the block to the new block location; and upon completion of the above for all blocks to be moved, removing the extent from the underlying file.

2. A method according to claim 1, wherein assigning the storage objects and their respective files to version sets includes recording, in a version set database, the version set identifiers in association with file identifiers of files, the version set identifiers identifying the respective version sets, the file identifiers for each version set identifier identifying the files assigned to the respective version set, and wherein using the version set identifier to identify the files whose corresponding storage objects are assigned to the version set with which the block is associated includes applying the version set identifier for the block to the version set database and retrieving the corresponding file identifiers.

3. A method according to claim 1, wherein the offset for each block is included in the respective block metadata for the block.

4. A method according to claim 1, wherein the upper file system is a thin file system to which underlying storage is automatically assigned by the storage processor, and wherein the method further includes continually monitoring an amount of free space being unused in storage assigned to the upper file system, and wherein the steps for reclaiming storage are initiated automatically by the storage processor in response to the amount of free space increasing above a predetermined threshold.

5. A method according to claim 1, wherein storage is allocated to the upper file system in multi-block slices each including a predetermined number of logically contiguous blocks, and where removing the extent from the underlying file includes removing the slices populating the extent.

6. A method according to claim 5, wherein the slices are drawn from and returned to a pool indirectly obtained from an underlying logical unit of storage defined on physical storage devices.

7. A method according to claim 5, wherein blocks of a given slice in the extent are data blocks and are moved to respective distinct new locations in respective different slices remaining assigned to the underlying file.

8. A method according to claim 7, wherein the method is used for reclaiming storage only in the form of user data as opposed to file metadata, the user data stored in blocks of data slices, the file metadata being stored on distinct metadata slices that are reclaimed by a separate process moving entire metadata slices intact.

9. A method according to claim 1, further including grouping the blocks by version set identifier and moving a first group of blocks for a first version set before moving a second group of blocks for a second version set, and wherein examining block pointers in the files for each group of blocks includes examining all block pointers for the group of blocks in a first file of the first version set before examining all block pointers for the group of blocks in a second file of the first version set.

10. A storage processor operative to reclaim storage assigned to an upper file system hosting a set of storage objects including primary objects and respective snapshot objects, the storage objects hosted as respective files of the upper file system backed by an underlying file of a lower file system, the underlying files constituted by respective sets of fixed-size blocks of the storage, the storage processor comprising:

communications interface circuitry connecting the storage processor to one or more host computers and to underlying physical storage on which the storage objects are stored, the host computers accessing the storage objects using respective storage commands directed to the storage processor;

one or more processors; and memory storing computer program instructions that are executed by the processors to cause the storage processor to reclaim the storage by:
  assigning the storage objects and their respective files to version sets, each primary object and its respective snapshot objects being assigned to a respective distinct version set, the files of each version set selectively sharing blocks, each block having corresponding block-specific block metadata containing a respective version set identifier identify the version set to which the files constituted by the block are assigned, the blocks of a given file having respective distinct block-specific block metadata, the block metadata forming part of the upper file system;
  identifying blocks in an extent of the underlying file to be moved, and for each identified block:
    i. obtaining an offset specifying a block location of the block in a file of the version set;
    ii. obtaining the version set identifier from the block metadata for the block and using the version set identifier to identify the files whose corresponding storage objects are assigned to the version set with which the block is associated;
    iii. using the offset to examine a block pointer at the block location in each of the identified files, and for each file whose block pointer points to the block, updating the block pointer to point to a new block location outside of the extent; and iv. moving the block to the new block location; and upon completion of the above for all blocks to be moved, remoting the extent from the underlying file.

11. A storage processor according to claim 10, wherein assigning the storage objects and their respective files to version sets includes recording, in a version set database, the version set identifiers in association with file identifiers of files, the version set identifiers identifying the respective version sets, the file identifiers for each version set identifier identifying the files assigned to the respective version set, and wherein using the version set identifier to identify the files whose corresponding storage objects are assigned to the version set with which the block is associated includes applying the version set identifier for the block to the version set database and retrieving the corresponding file identifiers.

12. A storage processor according to claim 10, wherein the offset for each block is included in the respective block for the block.

13. A storage processor according to claim 10, wherein the upper file system is a thin file system to which underlying storage is automatically assigned by the storage processor, and wherein the reclaiming of storage further includes continually monitoring an amount of free space being unused in storage assigned to the upper file system, and wherein the steps of reclaiming storage are initiated automatically by the storage processor in response to the amount of free space increasing above a predetermined threshold.

14. A storage processor according to claim 10, wherein storage is allocated to the upper file system in multi-block slices each including a predetermined number of logically contiguous blocks, and where removing the extent from the underlying file includes removing the slices populating the extent.

15. A storage processor according to claim 14, wherein the slices are drawn from and returned to a pool obtained indirectly from an underlying logical unit of storage defined on physical storage devices.

16. A storage processor according to claim 14, wherein blocks of a given slice in the extent are data blocks and are moved to respective distinct new locations in respective different slices remaining assigned to the underlying file.

17. A storage processor according to claim 16, wherein the steps for reclaiming storage are used only in the form of user data as opposed to file metadata, the user data stored in blocks of data slices, the file metadata being stored on distinct metadata slices that are reclaimed by a separate process moving entire metadata slices intact.

18. A storage processor according to claim 10, wherein the blocks are grouped by version set identifier and a first group of blocks for a first version set are moved before a second group of blocks for a second version set are moved, and wherein examining block pointers in the files for each group of blocks includes examining all block pointers for the group of blocks in a first file of the first version set before examining all block pointers for the group of blocks in a second file of the first version set.

19. A method according to claim 1, further including, at a time that each block becomes allocated to a respective primary file storing a corresponding primary object, then adding the version set identifier for the version set that includes the primary file to the block metadata for the block.

20. A method according to claim 1, wherein the storage processor provides data replication and the block metadata for each block includes a respective replica identifier identifying a replica that owns the block, the replica identifier being a monotonically increasing value assigned when a primary file storing a corresponding primary object and containing the block is created, and further including, for each of the identified blocks, obtaining the replica identifier from the block metadata of the identified block and using the replica identifier to limit the files of the respective version set to be examined and updated to those files of the version set having a replica identifier greater than or equal to the replica identifier from the block metadata.

* * * * *